United States Patent
Chen

(10) Patent No.: US 12,306,683 B2
(45) Date of Patent: May 20, 2025

(54) DISPLAY DEVICE, CONTROL METHOD AND NON-TRANSITORY COMPUTER READABLE STORAGE MEDIUM

(71) Applicant: HTC Corporation, Taoyuan (TW)

(72) Inventor: Po-Fei Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 387 days.

(21) Appl. No.: 17/804,600

(22) Filed: May 31, 2022

(65) Prior Publication Data
US 2023/0384845 A1    Nov. 30, 2023

(51) Int. Cl.
*G06F 1/20* (2006.01)
*G02B 27/01* (2006.01)

(52) U.S. Cl.
CPC .......... *G06F 1/206* (2013.01); *G02B 27/0176* (2013.01); *G06F 1/203* (2013.01)

(58) Field of Classification Search
CPC ..... G02B 27/0176; G06F 1/163; G06F 1/203; G06F 1/206
See application file for complete search history.

(56) References Cited

U.S. PATENT DOCUMENTS

| | | | | |
|---|---|---|---|---|
| 11,218,824 B1* | 1/2022 | Huo | ...................... | H04R 1/1083 |
| 2015/0267934 A1* | 9/2015 | Park | ......................... | F24F 11/77 |
| | | | | 700/300 |
| 2016/0171967 A1* | 6/2016 | Giaimo, III | ...... | G10K 11/17873 |
| | | | | 381/56 |
| 2016/0274361 A1 | 9/2016 | Border et al. | | |
| 2022/0253263 A1* | 8/2022 | Noam | ................. | G06F 3/04815 |
| 2024/0312447 A1* | 9/2024 | Yu | ......................... | H04R 1/1083 |

FOREIGN PATENT DOCUMENTS

| | | |
|---|---|---|
| CN | 104154021 A | 11/2014 |
| CN | 106163241 A | 11/2016 |
| CN | 109343681 A | 2/2019 |
| TW | 200950270 A | 12/2009 |

OTHER PUBLICATIONS

Corresponding Taiwan office action issued on Mar. 17, 2023.

* cited by examiner

*Primary Examiner* — Tameem D Siddiquee
(74) *Attorney, Agent, or Firm* — CKC & Partners Co., LLC

(57) ABSTRACT

The present disclosure provides a control method applied to a display device. The display device includes a processor, a display unit and a heat dissipating unit. The control method includes: by the processor, obtaining information related to the display device, wherein the information comprises a processor utilization rate of the processor, a display status of the display unit, a wearing status of the display device, noise sound data of the heat dissipating unit, rotational speed data of the heat dissipating unit or any combination thereof; and by the processor, controlling at least one of a system sound and the heat dissipating unit according to the information related to the display device, wherein the system sound is configured to be generated by a sound output unit.

18 Claims, 3 Drawing Sheets

DISPLAY DEVICE, CONTROL METHOD AND NON-TRANSITORY COMPUTER READABLE STORAGE MEDIUM

BACKGROUND

Field of Invention

This disclosure relates to a device and control method thereof, and in particular to a display device and control method thereof.

Description of Related Art

For preventing the electronic device from having heat damage, several approaches are conventionally used. Some of the approaches use the cooling fan. The cooling fan is usually controlled according to a change in the temperature. However, sometimes the temperature of the electronic device has been too high, and it is too late to decrease the temperature even if the running speed of the cooling fan is increased. Furthermore, the cooling fan with high running speed would generate loud noise, which might annoy the user of the electronic device, especially if the user mounts the electronic device (e.g., a head-mounted device (HMD)) on his/her head.

SUMMARY

An aspect of present disclosure relates to a control method applied to a display device. The display device includes a processor, a display unit and a heat dissipating unit. The control method includes: by the processor, obtaining information related to the display device, wherein the information comprises processor utilization rate of the processor, a display status of the display unit, a wearing status of the display device, noise sound data of the heat dissipating unit, rotational speed data of the heat dissipating unit or any combination thereof; and by the processor, controlling at least one of a system sound and the heat dissipating unit according to the information related to the display device, wherein the system sound is configured to be generated by a sound output unit.

Another aspect of present disclosure relates to a display device. The display device includes a display unit, a heat dissipating unit and a processor. The processor is coupled to the display unit and the heat dissipating unit and is configured to: obtain information related to the display device, wherein the information comprises processor utilization rate of the processor, a display status of the display unit, a wearing status of the display device, noise sound data of the heat dissipating unit, rotational speed data of the heat dissipating unit or any combination thereof; and control at least one of a system sound and the heat dissipating unit according to the information related to the display device, wherein the system sound is configured to be generated by a sound output unit.

Another aspect of present disclosure relates to a non-transitory computer readable storage medium with a computer program to execute a control method applied to a display device. The display device includes a processor, a display unit and a heat dissipating unit. The control method includes: by the processor, obtaining information related to the display device, wherein the information comprises processor utilization rate of the processor, a display status of the display unit, a wearing status of the display device, noise sound data of the heat dissipating unit, rotational speed data of the heat dissipating unit or any combination thereof; and by the processor, controlling at least one of a system sound and the heat dissipating unit according to the information related to the display device, wherein the system sound is configured to be generated by a sound output unit.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
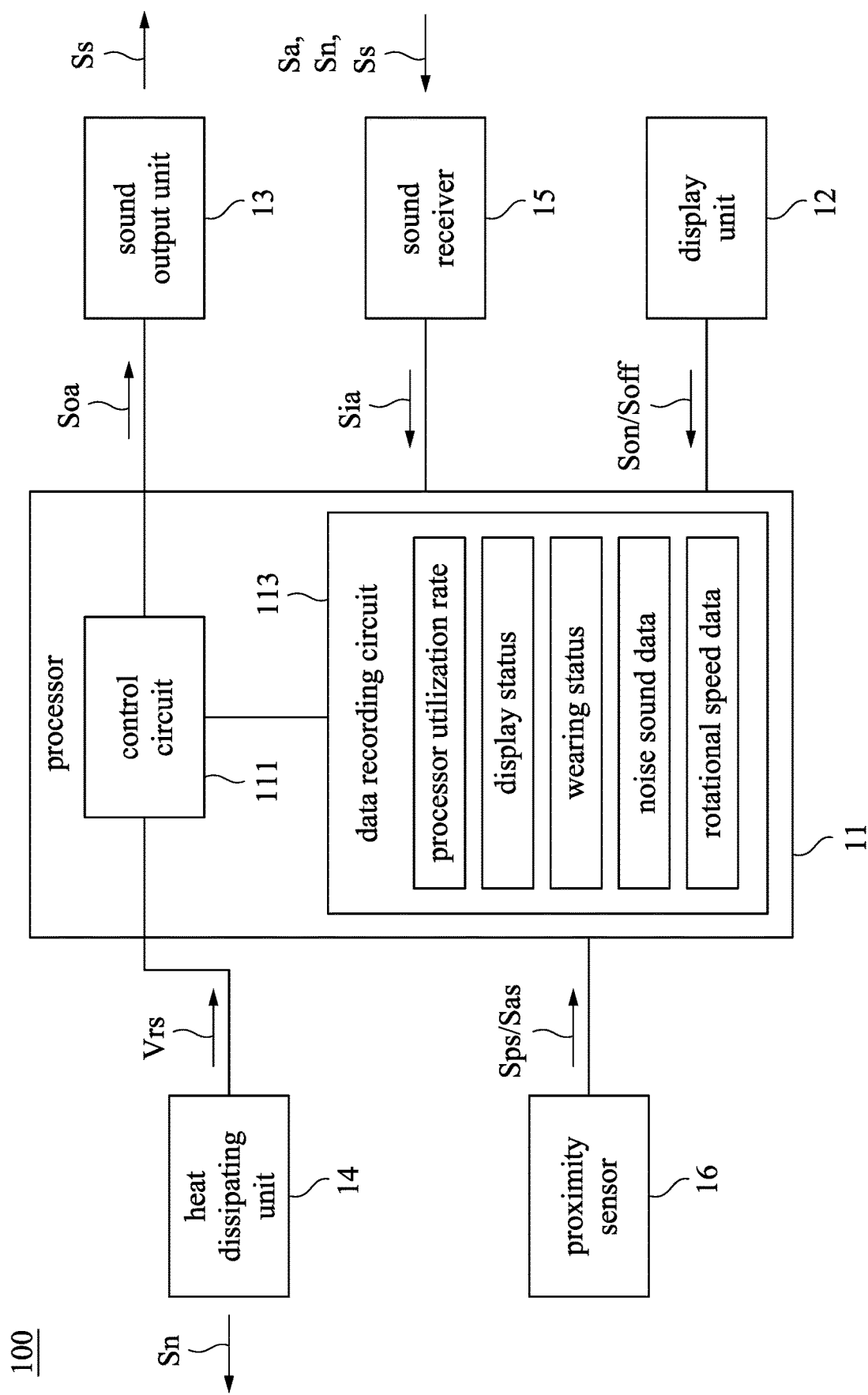
FIG. 1 is a block diagram of a display device in accordance with some embodiments of the present disclosure.

Referring to FIG. 1, FIG. 1 is a block diagram of a display device 100 in accordance with some embodiments of the present disclosure. In some embodiments, the display device 100 includes a processor 11, a display unit 12, a sound output unit 13, a heat dissipating unit 14, a proximity sensor 16 and a sound receiver 15.

Figure 2:
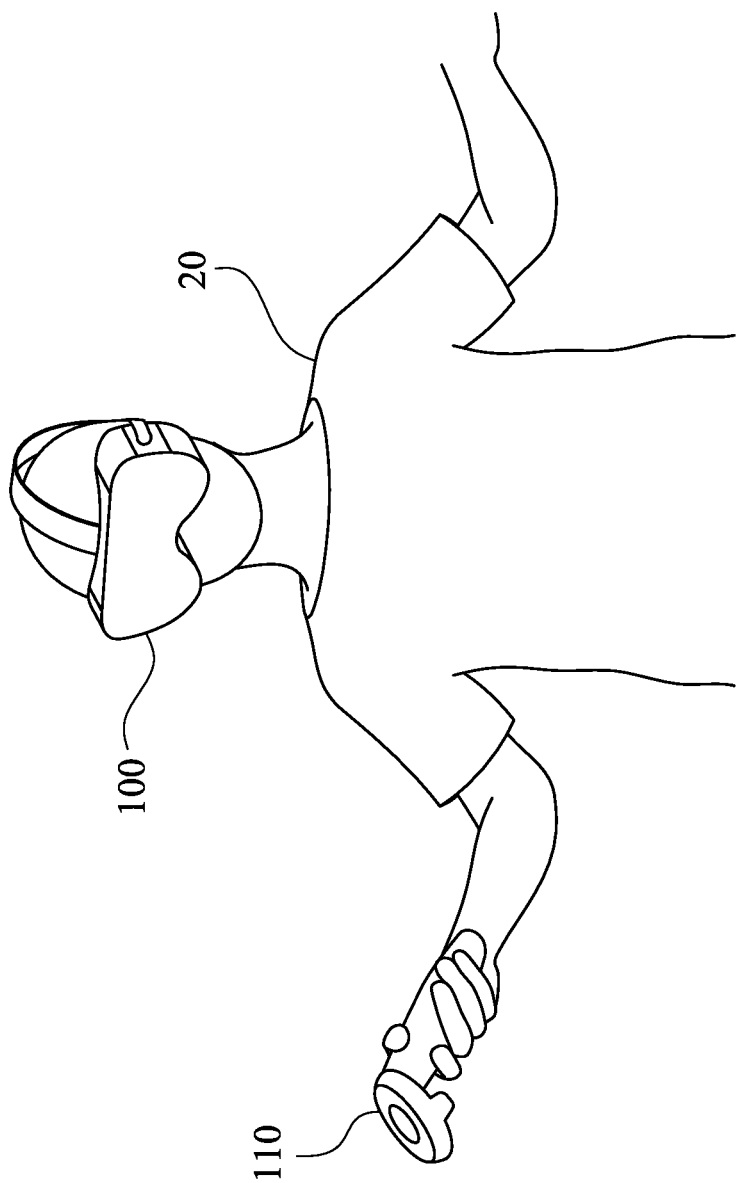
FIG. 2 is a schematic diagram of a multimedia system of a user in accordance with some embodiments of the present disclosure.

Referring to FIG. 2, FIG. 2 is a schematic diagram of a multimedia system 200 of a user 20 in accordance with some embodiments of the present disclosure. In some embodiments, the multimedia system 200 includes the display device 100 and a control device 110, the display device 100 is a user-wearable device (e.g., a head-mounted device (HMD)), and the control device 110 is a hand-held controller. For example, as shown in FIG. 2, the user 20 wears the display device 100 on his/her head and holds the control device 110 with his/her hand. The display device 100 is configured to display a virtual environment (not shown) including at least one virtual object to the user 20. In some embodiments, the virtual environment may be a completely immersed virtual reality (VR) environment, an augmented reality (AR) environment augmenting the real-world environment perceived by the user with the virtual object or a mixed reality (MR) environment merging multiple elements of both AR and VR to enable the virtual object co-existing and interacting with real objects. It can be appreciated that the user 20 can control the virtual object displayed by the display device 100 by operating the control device 110.

As shown in FIG. 1, the processor 11 is coupled to the display unit 12, the sound output unit 13, the heat dissipating unit 14, the proximity sensor 16 and the sound receiver 15. In particular, the processor 11 includes a control circuit 111 and a data recording circuit 113, and the control circuit 111 is coupled to the data recording circuit 113, the sound output unit 13 and the heat dissipating unit 14. In other words, the processor 11 can be coupled to the sound output unit 13 and the heat dissipating unit 14 through the control circuit 111. It can be appreciated that the control circuit 111 can further be coupled to the display unit 12, the proximity sensor 16 and the sound receiver 15 although it isn't illustrated in FIG. 1. Furthermore, the data recording circuit 113 can further be coupled to the display unit 12, the sound output unit 13, the heat dissipating unit 14, the proximity sensor 16 and the sound receiver 15 although it isn't illustrated in FIG. 1. In some embodiments, the processor 11 can be implemented by one or more central processing unit (CPU), application-specific integrated circuit (ASIC), microprocessor, system on a Chip (SoC) or other suitable processing units.

The display unit 12 is configured to display visual content (e.g., the virtual environment including the virtual object), so that the user 20 can see the visual content through the display unit 12 when wearing the display device 100. In some embodiments, the display unit 12 can be implemented by an AMOLED (active-matrix organic light-emitting diode) display, or the likes.

Furthermore, the processor 11 can generate an output audio signal Soa corresponding to the visual content displayed by the display unit 12. The sound output unit 13 is configured to convert the output audio signal Soa into a system sound Ss, so that the user 20 can hear voice, music and/or sound effect corresponding to the visual content when wearing the display device 100. In some embodiments, the sound output unit 13 can be implemented by a loudspeaker, or the likes.

The heat dissipating unit 14 is configured to dissipate heat from inside of the display device 100 to outside of the display device 100, so as to ensure normal operation of the display device 100. In some embodiments, the heat dissipating unit 14 can be implemented by a cooling fan, or the likes. It can be appreciated that the heat dissipating unit 14 may generate a noise sound Sn (e.g., a fan noise) when operating. The noise sound Sn may vary in frequency and/or intensity with the degree of loading (e.g., the rotational speed) of the heat dissipating unit 14.

As shown in FIG. 1, the sound receiver 15 is configured to receive and convert an ambient sound Sa, the noise sound Sn generated by the heat dissipating unit 14 and the system sound Ss generated by the sound output unit 13 into an input audio signal Sia. In some embodiments, the sound receiver 15 can be implemented by a microphone, or the likes. It can be appreciated that the sound receiver 15 can also receive a user-generated sound (e.g., the user 20's voice) in some embodiments, so as to facilitate the communication between the display device 100 and another display device operated by another user.

As shown in FIG. 1 again, the proximity sensor 16 is configured to detect whether an object (e.g., the user 20's head) is present or absent and is configured to output an object-presence signal Sps (e.g., a signal having a high voltage level) or an object-absence signal Sas (e.g., a signal having a low voltage level) according to the detection result. In particular, the proximity sensor 16 outputs the object-presence signal Sps if detecting that the object is present. In some embodiments, the object-presence signal Sps is configured to indicate that the display device 100 is mounted on the head of the user 20. The proximity sensor 16 outputs the object-absence signal Sas if detecting that the object is absent. In some embodiments, the object-absence signal Sas is configured to indicate that the display device 100 is separated from the head of the user 20.

The processor 11 is configured to obtain information related to the display device 100. In particular, the processor 11 can utilize the data recording circuit 113 to obtain and store the information related to the display device 100, but the present disclosure is not limited herein. As shown in FIG. 1, the information related to the display device 100 includes a processor utilization rate of the processor 11, a display status of the display unit 12, a wearing status of the display device 100, noise sound data of the heat dissipating unit 14, rotational speed data of the heat dissipating unit 14 or any combination thereof. The operations of obtaining the information related to the display device 100 are described in detail below.

In order to generate the processor utilization rate of the processor 11, the processor 11 can utilize the data recording circuit 113 to calculate at least one processor utilization value. For example, the data recording circuit 113 calculates a current processor utilization value by subtracting a ratio of a processor idle time to a processor total time from 1, so as to use the current processor utilization value as the processor utilization rate. In some embodiments, the processor total time might be a time elapses after the display device 100 is turned on. In some embodiments, the processor total time might be a sum of the processor idle time and a processor execution time, and the processor execution time might be a time that the processor 11 executes processing (e.g., displaying the visual content, generating the output audio signal Soa corresponding to the visual content). As another example, the data recording circuit 113 calculates multiple processor utilization values during a predetermined period, so as to use an average value of the multiple processor utilization values as the processor utilization rate.

The processor 11 can utilize the data recording circuit 113 to detect whether the display status of the display unit 12 is "ON" or "OFF". For example, the data recording circuit 113 detects whether the display status is "ON" or "OFF" based on a reception of a display-on signal Son (e.g., a signal having a high voltage level) or a display-off signal Soff (e.g., a signal having a low voltage level). In particular, if the display unit 12 is displaying the visual content, the display-on signal Son is received by the processor 11, so that the data recording circuit 113 detects that the display status is "ON". If the display unit 12 is not displaying the visual content, the display-off signal Soff is received by the processor 11, so that the data recording circuit 113 detects that the display status is "OFF". As shown in FIG. 1, the display-on signal Son and the display-off signal Soff can be generated and outputted by the display unit 12. However, the present disclosure is not limited herein. It can be appreciated that the display-on signal Son and the display-off signal Soff can be generated and outputted by a screen controller (not shown, such as a display driver IC (DDIC), a timing controller (TCON), or the likes) configured to control the display unit 12.

The processor 11 can utilize the data recording circuit 113 to detect whether the wearing status is "Wearing" or "Not Wearing". For example, the data recording circuit 113 detects whether the wearing status is "Wearing" or "Not Wearing" based on a reception of the object-presence signal Sps or the object-absence signal Sas. In particular, if the user 20 is wearing the display device 100, the proximity sensor 16 outputs the object-presence signal Sps to the processor 11, so that the data recording circuit 113 detects that the wearing status is "Wearing". If the user 20 is not wearing the display device 100, the proximity sensor 16 outputs the object-absence signal Sas to the processor 11, so that the data recording circuit 113 detects that the wearing status is "Not Wearing".

In order to obtain the noise sound data of the heat dissipating unit 14, the processor 11 can process the input audio signal Sia outputted by the sound receiver 15. It can be appreciated that the input audio signal Sia has at least a first component corresponding to the ambient sound Sa, a second component corresponding to the noise sound Sn and a third component corresponding to the system sound Ss. Therefore, the processor 11 filters the input audio signal Sia (e.g., filtering out the first component and the third component) to leave the second component corresponding to the noise sound Sn to be the noise sound data. In other words, the noise sound data corresponds to the noise sound Sn generated by the heat dissipating unit 14. Notably, the processor 11 can further analyze the intensity of the second component, so that the noise sound data is capable of reflecting the intensity of the noise sound Sn.

In order to obtain the rotational speed data of the heat dissipating unit 14, the processor 11 can utilize the data recording circuit 113 to collect at least one rotational speed value Vrs of the heat dissipating unit 14. For example, the data recording circuit 113 collects and uses a current rotational speed value Vrs as the rotational speed data. For another example, the data recording circuit 113 collects multiple rotational speed values Vrs during a predetermined period, and then uses an average value of the multiple rotational speed values Vrs as the rotational speed data. As shown in FIG. 1, the rotational speed value Vrs can be outputted by the heat dissipating unit 14. However, the present disclosure is not limited herein. It can be appreciated that the rotational speed value Vrs can be outputted by a heat dissipating controller (not shown) configured to control the rotational speed the heat dissipating unit 14.

If the information related to the display device 100 is stored in the processor 11, the processor 11 can control at least one of the system sound Ss and the heat dissipating unit 14 according to at least one of the processor utilization rate, the display status, the wearing status, the noise sound data and the rotational speed data. In particular, the processor 11 can utilize the control circuit 111 to control at least one of the system sound Ss and the heat dissipating unit 14. The operations of controlling at least one of the system sound Ss and the heat dissipating unit 14 are described in detail below.

In some embodiments, the processor 11 utilizes the control circuit 111 to control the heat dissipating unit 14 according to the processor utilization rate. In some practical applications, the visual content displayed by the display unit 12 is of high quality (e.g., high-level effect, high scene detail, high boundary fineness and/or high resolution), which results in increase of the processor utilization rate. It can be appreciated that the processor 11 may generate more heat as the processor utilization rate increases. Therefore, the control circuit 111 of the processor 11 adjusts the rotational speed of the heat dissipating unit 14 to prevent the display device 100 from having heat damage and low performance. In some embodiments, the greater the processor utilization rate is, the higher the rotational speed of the heat dissipating unit 14 is. For example, if the processor utilization rate is greater than a utilization threshold (e.g., 60%), the processor 11 utilizes the control circuit 111 to increase the rotational speed of the heat dissipating unit 14. For another example, the rotational speed of the heat dissipating unit 14 is increased by the processor 11 if a time that the processor utilization rate is greater than the utilization threshold meets a time threshold (e.g., 3 sec). Furthermore, in some embodiments, the smaller the processor utilization rate is, the lower the rotational speed of the heat dissipating unit 14 is. For example, if the processor utilization rate is changed from being greater than the utilization threshold to being smaller than the utilization threshold, the rotational speed of the heat dissipating unit 14 can be decreased by the processor 11. It can be appreciated that there may be multiple different utilization thresholds in other embodiments, so that the adjustment to the rotational speed of the heat dissipating unit 14 can be tiered or stepped.

Notably, in comparison with temperature-based control of heat dissipation, the display device 100 of the present disclosure provides a steadier mechanism for preventing heat damage by controlling the heat dissipating unit 14 according to the processor utilization rate (because the change of temperature may lag behind the change of the processor utilization rate).

In some embodiments, the processor 11 utilizes the control circuit 111 to control the heat dissipating unit 14 according to the display status. It can be appreciated that the display status and the processor utilization rate are closely related. In some practical applications, the user 20 is wearing the display device 100, and the display device 100 currently processes a scene-to-scene transition. Before or after the scene-to-scene transition, the display unit 12 may be displaying the visual content, so that the processor 11 may have high processor utilization rate. In the scene-to-scene transition, the display unit 12 may be not displaying the visual content and may be turned off or be dimmed, so that the processor 11 may have low processor utilization rate. Accordingly, if the display status is "ON", the processor 11 utilizes the control circuit 111 to increase the rotational speed of the heat dissipating unit 14 (because the processor utilization rate is high). Also, if the display status is "OFF", the processor 11 utilizes the control circuit 111 to decrease the rotational speed of the heat dissipating unit 14 (because the processor utilization rate is low).

In some embodiments, the processor 11 utilizes the control circuit 111 to control the heat dissipating unit 14 according to the wearing status. It can be appreciated that the wearing status and the processor utilization rate are closely related as well. If the proximity sensor 16 outputs the object-presence signal Sps (because the user 20 is wearing the display device 100), the display device 100 may be fully operable to meet all requirements of the user 20 instantly, so that the processor 11 may have high processor utilization rate. If the proximity sensor 16 outputs the object-absence signal Sas (because the user 20 is not wearing the display device 100), the display device 100 may enter an idle status to save power, and therefore the processor 11 may have low processor utilization rate. Accordingly, if the wearing status is "Wearing", the processor 11 utilizes the control circuit 111 to increase the rotational speed of the heat dissipating unit 14 (because the processor utilization rate is high). Also, if the wearing status is "Not Wearing", the processor 11 utilizes the control circuit 111 to decrease the rotational speed of the heat dissipating unit 14 (because the processor utilization rate is low).

Although the high rotational speed of the heat dissipating unit 14 can prevent the display device 100 from having heat damage, it may cause loud noise to the user 20, especially in the condition that the user 20 wears the display device 100 on his/her head. Accordingly, in some embodiments, the processor 11 utilizes the control circuit 111 to control the system sound Ss according to the noise sound data, so as to cover the noise sound Sn generated by the heat dissipating unit 14 with the system sound Ss outputted by the sound output unit 13. In particular, the control circuit 111 of the processor 11 can determine the intensity (or the magnitude) of the noise sound data corresponding to the noise sound Sn and can adjust the volume of the system sound Ss according to the determination result. In some embodiments, the greater the intensity of the noise sound data is, the larger the volume of the system sound Ss is. For example, if the noise sound data is greater than an intensity threshold (e.g., 35 dBA), the volume of the system sound Ss is increased. Also, in some embodiments, the smaller the intensity of the noise sound data is, the smaller the volume of the system sound Ss is. For example, if the noise sound data is not greater than the intensity threshold, the volume of the system sound Ss is decreased. It can be appreciated that there may be multiple different intensity thresholds in other embodiments, so that the adjustment to the volume of the system sound Ss can be tiered or stepped.

It can be appreciated that the rotational speed and the noise sound Sn of the heat dissipating unit 14 are closely related. Therefore, in some embodiments, the processor 11 utilizes the control circuit 111 to control the system sound Ss according to the rotational speed data, and the sound receiver 15 may be omitted in these embodiments. In particular, the control circuit 111 of the processor 11 can determine the value of the rotational speed data and can adjust the volume of the system sound Ss according to the determination result. In some embodiments, the greater the rotational speed data is, the larger the volume of the system sound Ss is. For example, if the rotational speed data is greater than a rotational speed threshold (e.g., 9000 RPM), the volume of the system sound Ss is increased. Also, in some embodiments, the smaller the rotational speed data is, the smaller the volume of the system sound Ss is. For example, if the rotational speed data is not greater than the rotational speed threshold, the volume of the system sound Ss is decreased. It can be appreciated that there may be multiple different rotational speed thresholds in other embodiments, so that the adjustment to the volume of the system sound Ss can be tiered or stepped.

In some embodiments, in order to control the volume of the system sound Ss, the processor 11 is configured to adjust the gain of the sound output unit 13, but the present disclosure is not limited herein. In other embodiments, the processor 11 is configured to adjust the intensity (or magnitude) of the output audio signal Soa. For example, the processor 11 can generate the output audio signal Soa with high intensity when the noise sound data indicates that the intensity of the noise sound Sn is too high.

It can be seen from above descriptions that the processor 11 is configured to control the heat dissipating unit 14 according to at least one of the processor utilization rate of the processor 11, the display status of the display unit 12 and the wearing status of the display device 100. In addition, the processor 11 is configured to control the system sound Ss according to at least one of the noise sound data and the rotational speed data of the heat dissipating unit 14.

In the above embodiments, the display unit 12, the proximity sensor 16 and the sound receiver 15 can be controlled by the control circuit 111 of the processor 11 as well, but the present disclosure is not limited herein. For example, the display device 100 may include other controllers (not shown) configured to control the display unit 12, the proximity sensor 16 and the sound receiver 15.

In the above embodiments, the sound output unit 13 may be realized by loudspeakers, but the present disclosure is not limited herein. For example, the display device 100 can further include an audio jack interface (not shown), and the user 20 may provide an additional and independent sound output unit such as earphones. Additional earphones may be connected to the audio jack interface by the user 20 to receive and convert the output audio signal Soa into the system sound Ss, so that the user 20 can hear the system sound Ss through the earphones, that is, the sound output unit 13 may be omitted from the display device 100. In such arrangement, the sound receiver 15 would not receive the system sound Ss. In other words, the sound receiver 15 is configured to receive and convert at least the ambient sound Sa and the noise sound Sn into the input audio signal Sia. In view of the descriptions in this paragraph, the system sound Ss can be generated by the sound output unit 13 of the display device 100 or the independent sound output unit provided by the user 20.

Figure 3:
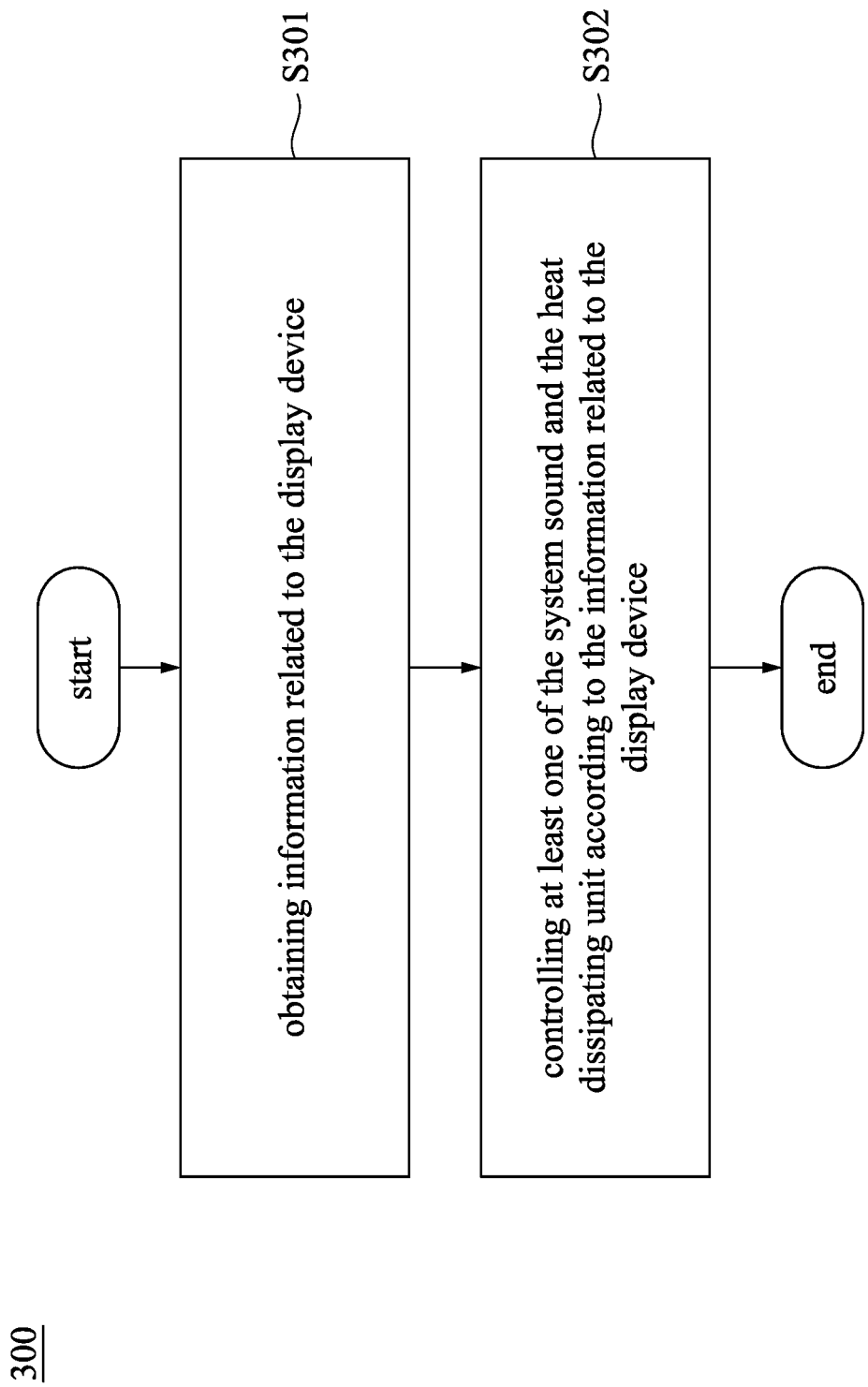
FIG. 3 is a flow diagram of a control method in accordance with some embodiments of the present disclosure.

Referring to FIG. 3, FIG. 3 is a flow diagram of a control method 300 in accordance with some embodiments of the present disclosure. The control method 300 can be performed by the processor 11 of the display device 100 of FIG. 1. As shown in FIG. 3, the control method 300 includes operations S301-S302.

In operation S301, the processor 11 obtains information related to the display device 100. The descriptions of obtaining the information related to the display device 100 are same or similar to those of the above embodiments, and therefore are omitted herein.

In operation S302, the processor 11 controls at least one of the system sound Ss and the heat dissipating unit 14 according to the information related to the display device 100. The descriptions of controlling at least one of the system sound Ss and the heat dissipating unit 14 are same or similar to those of the above embodiments, and therefore are omitted herein.

In sum, by controlling the heat dissipating unit according to at least one of the processor utilization rate, the displaying status and the wearing status, the display device of the present disclosure can pre-adjust the rotational speed of the heat dissipating unit before the temperature of the display device being too high. In addition, by controlling the system sound generated by the sound output unit according to at least one of the noise sound data and the rotational speed data of the heat dissipating unit, the display device of the present disclosure can provide the system sound with appropriate volume to the user, so that the user wouldn't be annoyed by the noise sound generated by the heat dissipating unit.

The disclosed methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the at least one processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A control method applied to a display device, wherein the display device comprises a processor, a display unit and a heat dissipating unit, and the control method comprises:
   by the processor, obtaining information related to the display device, wherein the information comprises a processor utilization rate of the processor, a display status of the display unit, a wearing status of the display device, noise sound data of the heat dissipating unit, rotational speed data of the heat dissipating unit or any combination thereof;
   by the processor, controlling a rotational speed of the heat dissipating unit according to the processor utilization rate, the display status, and the wearing status; and
   by the processor, controlling a volume of a system sound according to the noise sound data and the rotational speed data, wherein the system sound is configured to be generated by a sound output unit, the noise sound data is generated by the processor filtering an input audio signal outputted by a sound receiver and comprising a first component corresponding to an ambient sound, a second component corresponding to a noise sound generated by the heat dissipating unit and a third component corresponding to the system sound, and the first component and the third component of the input audio signal are filtered out.

2. The control method of claim 1, wherein controlling the rotational speed of the heat dissipating unit comprises:
   increasing the rotational speed of the heat dissipating unit according to the processor utilization rate, wherein the greater the processor utilization rate is, the higher the rotational speed is.

3. The control method of claim 1, wherein controlling the rotational speed of the heat dissipating unit comprises:
   increasing the rotational speed of the heat dissipating unit in response to that the display status is "ON"; and
   decreasing the rotational speed of the heat dissipating unit in response to that the display status is "OFF".

4. The control method of claim 1, wherein controlling the rotational speed of the heat dissipating unit comprises:
   increasing the rotational speed of the heat dissipating unit in response to that the wearing status is "Wearing"; and
   decreasing the rotational speed of the heat dissipating unit in response to that the wearing status is "Not Wearing".

5. The control method of claim 1, wherein controlling the volume of the system sound comprises:
   increasing the volume of the system sound outputted by the sound output unit according to the noise sound data, wherein the greater an intensity of the noise sound data is, the larger the volume of the system sound is; and
   decreasing the volume of the system sound outputted by the sound output unit according to the noise sound data, wherein the smaller the intensity of the noise sound data is, the smaller the volume of the system sound is.

6. The control method of claim 1, wherein controlling the volume of the system sound comprises:
   increasing the volume of the system sound outputted by the sound output unit according to the rotational speed data, wherein the greater the rotational speed data is, the larger the volume of the system sound is; and
   decreasing the volume of the system sound outputted by the sound output unit according to the rotational speed data, wherein the smaller the rotational speed data is, the smaller the volume of the system sound is.

7. The control method of claim 1, wherein obtaining information related to the display device comprises:
   calculating at least one processor utilization value of the processor to generate the processor utilization rate;
   detecting whether the display status is "ON" or "OFF", wherein the display status is "ON" if the display unit is displaying, and the display status is "OFF" if the display unit is not displaying; and
   collecting at least one rotational speed value of the heat dissipating unit to generate the rotational speed data.

8. The control method of claim 7, wherein the display device further comprises a proximity sensor and the sound receiver, and obtaining information related to the display device comprises:
   detecting whether the wearing status is "Wearing" or "Not Wearing", wherein the wearing status is "Wearing" if the proximity sensor detects a presence of an object, and the wearing status is "Not Wearing" if the proximity sensor detects an absence of the object; and
   filtering the input audio signal outputted by the sound receiver to generate the noise sound data of the heat dissipating unit.

9. A display device, comprising:
   a display unit;
   a heat dissipating unit; and
   a processor coupled to the display unit and the heat dissipating unit and configured to:
   obtain information related to the display device, wherein the information comprises a processor utilization rate of the processor, a display status of the display unit, a wearing status of the display device, noise sound data of the heat dissipating unit, rotational speed data of the heat dissipating unit or any combination thereof;
   control a rotational speed of the heat dissipating unit according to the processor utilization rate, the display status, and the wearing status; and
   control a volume of a system sound according to the noise sound data and the rotational speed data, wherein the system sound is configured to be generated by a sound output unit, the noise sound data is generated by the processor filtering an input audio signal outputted by a sound receiver and comprising a first component corresponding to an ambient sound, a second component corresponding to a noise sound generated by the heat dissipating unit and a third component corresponding to the system sound, and the first component and the third component of the input audio signal are filtered out.

10. The display device of claim 9, wherein the processor increases the rotational speed of the heat dissipating unit according to the processor utilization rate, wherein the greater the processor utilization rate is, the higher the rotational speed is.

11. The display device of claim 9, wherein the processor increases the rotational speed of the heat dissipating unit in response to that the display status is "ON";

wherein the processor decreases the rotational speed of the heat dissipating unit in response to that the display status is "OFF".

12. The display device of claim 9, wherein the processor increases the rotational speed of the heat dissipating unit in response to that the wearing status is "Wearing";
wherein the processor decreases the rotational speed of the heat dissipating unit in response to that the wearing status is "Not Wearing".

13. The display device of claim 9, wherein the processor increases the volume of the system sound outputted by the sound output unit according to the noise sound data, wherein the greater an intensity of the noise sound data is, the larger the volume of the system sound is;
wherein the processor decreases the volume of the system sound outputted by the sound output unit according to the noise sound data, wherein the smaller the intensity of the noise sound data is, the smaller the volume of the system sound is.

14. The display device of claim 9, wherein the processor increases the volume of the system sound outputted by the sound output unit according to the rotational speed data, wherein the greater the rotational speed data is, the larger the volume of the system sound is;
wherein the processor decreases the volume of the system sound outputted by the sound output unit according to the rotational speed data, wherein the smaller the rotational speed data is, the smaller the volume of the system sound is.

15. The display device of claim 9, wherein the processor is configured to calculate at least one processor utilization value of the processor to generate the processor utilization rate, is configured to detect whether the display status is "ON" or "OFF" and is configured to collect at least one rotational speed value of the heat dissipating unit to generate the rotational speed data;
wherein the display status is "ON" if the display unit is displaying, and the display status is "OFF" if the display unit is not displaying.

16. The display device of claim 15, wherein the display device further comprises a proximity sensor and the sound receiver, the processor is coupled to the proximity sensor and the sound receiver, and the processor is configured to detect whether the wearing status is "Wearing" or "Not Wearing";
wherein the wearing status is "Wearing" if the proximity sensor detects a presence of an object, and the wearing status is "Not Wearing" if the proximity sensor detects an absence of the object.

17. The display device of claim 16, wherein the sound receiver is configured to receive and convert at least the noise sound generated by the heat dissipating unit and the ambient sound into the input audio signal.

18. A non-transitory computer readable storage medium with a computer program to execute a control method, wherein the control method is applied to a display device, the display device comprises a processor, a display unit and a heat dissipating unit, and the control method comprises:
by the processor, obtaining information related to the display device, wherein the information comprises a processor utilization rate of the processor, a display status of the display unit, a wearing status of the display device, noise sound data of the heat dissipating unit, rotational speed data of the heat dissipating unit or any combination thereof;
by the processor, controlling a rotational speed of the heat dissipating unit according to the processor utilization rate, the display status, and the wearing status; and
by the processor, controlling a volume of a system sound according to the noise sound data and the rotational speed data, wherein the system sound is configured to be generated by a sound output unit, the noise sound data is generated by the processor filtering an input audio signal outputted by a sound receiver and comprising a first component corresponding to an ambient sound, a second component corresponding to a noise sound generated by the heat dissipating unit and a third component corresponding to the system sound, and the first component and the third component of the input audio signal are filtered out.

* * * * *